United States Patent [19]
Lombardi et al.

[11] 3,903,048

[45] Sept. 2, 1975

[54] CATALYST SYSTEMS FOR LOWERING EPOXY RESIN CURE TEMPERATURES

[75] Inventors: Andrew D. Lombardi, Pittsburgh; Thomas W. Smeal, Delmont, both of Pa.

[73] Assignee: United States Steel Corporation, Pittsburgh, Pa.

[22] Filed: Apr. 2, 1973

[21] Appl. No.: 347,270

[52] U.S. Cl. ........ 260/47 EN; 260/2 N; 260/37 EP; 260/59; 260/91.3 VA
[51] Int. Cl.² ........................................ C08G 30/14
[58] Field of Search ........... 260/47 EN, 47 EC, 2 N, 260/2 EC, 830, 59, 91.3 VA; 252/182

[56] References Cited
UNITED STATES PATENTS

| | | |
|---|---|---|
| 2,847,395 | 8/1958 | Wear ...................................... 260/2 |
| 3,397,156 | 8/1968 | Lopez et al. .......................... 260/47 |
| 3,554,967 | 1/1971 | Uelzmann ............................. 260/47 |
| 3,562,215 | 2/1971 | Moore ................................. 260/830 |

*Primary Examiner*—Melvin Goldstein
*Assistant Examiner*—T. Pertilla
*Attorney, Agent, or Firm*—William L. Krayer

[57] ABSTRACT

New structural adhesives are disclosed in which an epoxy resin is cured with dicyandiamide. The curing of the epoxy resin by dicyandiamide is accelerated by the addition of appropriate amounts of organic compounds containing certain active groups such as SCN, NH, $NH_2$, SH, N, or CN, in combination with azo, hydroxyl, H:N, or sulfur groups.

7 Claims, No Drawings

CATALYST SYSTEMS FOR LOWERING EPOXY RESIN CURE TEMPERATURES

BACKGROUND OF THE INVENTION

It has been known prior to the present invention to cure epoxy resins with dicyandiamide. See, for example, U.S. Pat. Nos., 3,297,635, 3,420,794, 3,530,093 and Netherlands Patent Application No. 6,609,550.

It has also been known in the past to use various types of accelerators for other curing agents. See, for example: Schroeder, U.S. Pat. No. 2,831,830; Bressler, U.S. Pat. No. 3,029,286; Mika, U.S. Pat. No. 3,091,595; Rainer, U.S. Pat. No. 3,189,646; Fulmer, U.S. Pat. No. 3,265,664; Vertik, U.S. Pat. No. 3,271,350; Newey, U.S. Pat. No. 3,291,776; Greene, U.S. Pat. No. 3,346,532; Hickner, U.S. Pat. No. 3,415,902; and Perse, U.S. Pat. No. 3,472,610; and South African Pat. No. 5,567(68).

Dicyandiamide has not found wide use as a curing agent because until the present invention a suitable accelerator has not been found to reduce the temperature of decomposition of dicyandiamide which is so high (350 F) as to cause problems of metal warpage, discoloration, excessive curing times due to the necessity of heating up the assembly, and excessive residual stress in the bond due to the wide temperature difference between curing and service of the bonded part.

Excellent structural adhesives have been made using dicyandiamide (dicy) as a curative for epoxy resin; however, the temperatures required to react to dicy are too high for many applications, or the time at temperature is too long.

It is known that the curing of epoxy resin by dicy is accelerated by amines, amides, quaternary compounds, substituted ureas and melamines, zinc and cadmium salts of amines, and other amine salts. However, these all have serious shortcomings because they adversely affect strength and durability, or have only a slight accelerating effect. Latent curatives other than dicy, such as (1) dihydrazides, (2) extra-coordinate siliconate salts, (3) Lewis acid salts and (4) complex organic polysalts have also been used. The first two of these are too slow and require too high a temperature; the third generally produces adhesives with mediocre adhesive strengths; and the adhesives that employ the fourth approach have adversely affected properties, especially peel strength and resistance to aging at elevated temperatures, although cure is accomplished quickly and at relatively low temperature. The technologies of microencapsulation and molecular sieves have never been adapted to structural epoxy adhesives, and the use of frozen epoxies is limited by practical aspects.

SUMMARY OF THE INVENTION

This invention utilizes a group of accelerators, for the reaction of dicy with epoxy, that has not previously been recognized as being able to accelerate this reaction. Its advantages are: (1) high adhesive strengths are attainable, (2) good resistance to heat aging is obtained, (3) cure temperatures are lowered significantly, and (4) cure times are shortened significantly. This invention is different from the prior practices described above in that it combines high strength and high heat resistance with moderate cure temperatures and short cure times. All of the prior practices are deficient in at least one of these qualities. As an example, the only approach described above that we know to be in commercial use is the use of latent curatives composed of complex organic polysalts. Such an adhesive has been tested and has been found to develop low adhesive strengths, particularly peel strength and especially at temperatures below −67°F and above 250°F. In addition, the resistance to heat aging was poor, although the cure temperature and time were good.

The epoxy ether resins suitable for use in the compositions of the present invention include the epoxy polyethers of polyhydric phenols obtained by reacting a polyhydric phenol with a halogen-containing epoxide in an alkaline medium. Polyhydric phenols that can be used for this purpose include, among others, resorcinol, catechol, hydroquinone, methylresorcinol, polynuclear phenols, such as 2,2-bis(4-hydroxyphenyl) propane (Bis-phenol A); 2,2-bis-(4-hydroxyphenyl)-butane; 4,4′-dihydroxy-benzophenone; bis (4-hydroxyphenyl)-ethane; 2,2-bis (4-hydroxyphenyl)-pentane; and 1,5-dihydroxynaphthalene and the like. The halogen-containing epoxides may be exemplified by 1-chloro-2, 3 epoxypropane (epichlorohydrin); 3-chloro-1,2-epoxybutane; 3-bromo-1,2-epoxybutane; 3-chloro-1,2-epoxyoctane; and the like. Preferred polyepoxides of this type are the glycidyl polyethers of dihydric phenols produced by the method from dihydric phenols and epichlorohydrin. The monomer products of this type may be represented by the general formula:

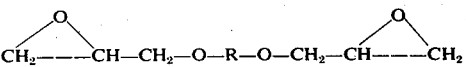

where R represents divalent hydrocarbon radical of the dihydric phenol, having up to 20 or more carbon atoms, usually not more than 16. The polymeric products will generally not be a single simple molecule but will be a complex of glycidyl polyethers of the general formula:

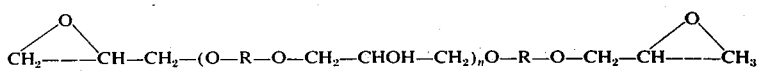

wherein R is a divalent hydrocarbon radical of the dihydric phenol and n is an integer of the series 0, 1, 2, 3, etc. While for any single molecule of the polether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide. The reaction is preferably accomplished at temperatures within the range of from 50° C to 150° C. The heating is continued for several hours to effect the reaction and the product is then washed free of salt and base.

These epoxy resins are avaiable in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical COrporation, "Gen Epoxy" (General Mills). "DER Resins" (Dow Chemical Company), "Araldite" (Ciba), "ERL Resins" (Bakelite Corporation), "Epi-Rez" (Jones Dabney), and "Epiphen" (The Borden Company).

Another group of polyepoxides that can be used comprises the glycidyl ethers of novolak resins, which resins are obtained by condensing an aldehyde with a phenol under acid conditions. Typical members of this class are the epoxy resins formed by condensing formaldehyde with phenol or cresol and reacting the novolak resin thus obtained with epichlorohydrin.

Other polyepoxides include the polyepoxy polyethers comprising ethers of epoxy alcohols and polyhydric alcohols such as obtained by reacting, preferably in the presence of an acid-acting compound such as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, mannitol, pentaerythritol, polyallyl alcohol, polyvinyl alcohol, trimethylolpropane, bis (4-hydroxycyclohexyl) dimethylmethane, 1,4-dimethylolbenzene, and the like. Particularly preferred members of this group comprise the glycidyl polyethers of aliphatic polyhydric alcohols containing from 2 to 10 carbon atoms and having from 2 to 6 hydroxyl groups and more, preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

The present invention consists of adding to a compounded dicyepoxy resin composition from 0.1 to 10.0 percent, and preferably 1.0 to 3.0 percent, of an accelerator, said accelerator being an organic compound having 2 to 12 carbon atoms and containing one or more SCN, NH, $NH_2$, SH, N, or CN groups in combination with one or more N:N, N:H, OH, or S groups. Examples of compounds that are suitable in this invention are dimethyldithiocarbamic acid dimethylammonium salt, bis (dimethylthiocarbamyl) sulfide, benzotriazole, tetramethylthiuram disulfide, 2-mercaptoethanol, 3,3'-thiodipropionitrile, and tetraethylthiuram disulfide. These are only examples of suitable compounds, therefore this list is nonlimiting.

EXAMPLE 1

A reduction in gel time of a dicy epoxy adhesive was achieved by use of 2.5 percent of the indicated accelerators. The adhesive formulation was: epoxy resin (diglycidyl ether of bisphenol A having epoxy equivalent weight of 182 to 195) - 49.08%, dicy - 3.83%, flexibilizer - 1.64%, aluminum powder - 40.90%, gellant - 4.10%, adhesion promoter - 0.41%, and antioxidants - 0.04%. The following procedure was used to measure gel time. One-gram aliquots of adhesive were put on aluminum foil and placed in a forced draft oven operating at 300° F. for a specific period of time. Each aliquot was removed from the oven after a specific time period and immediately probed with a stainless steel rod. If the adhesive was soft, another aliquot of the same composition was placed in the oven for a longer time. If the adhesive was hard and could not be penetrated with the rod, another aliquot of the same composition was placed in the oven for a shorter time. In this manner, the period of time required for the adhesive to become hard was determined very closely and recorded in the following Table I as gel time at 300° F. in minutes.

Table I

| Accelerator | Minutes to gel at 300°F. |
| --- | --- |
| None | 45 to 50 |
| Dimethyldithiocarbamic acid dimethylammonium salt $[(CH_3)_2NCSSNH_2 (CH_3)_2]$ | 4 |
| Bis (dimethylthiocarbamyl) sulfide $[[(CH_3)_2NCS]_2S]$ | 9 |
| Benzotriazole $[C_6H_4NHN:N]$ | 9 |
| Tetramethylthiuram disulfide $[[(CH_3)_2NCS]_2S_2]$ | 11 |
| 2-Mercaptoethanol $[HSCH_2CH_2OH]$ | 20 to 30 |
| 3-3'-Thiodipropionitrile $[S(CH_2CH_2CN)_2]$ | 20 to 30 |
| 3-Anilinopropionitrile $[C_6H_5NHCH_2CH_2CN]$ | 45 |
| Butyl sulfide $[[CH_3(CH_2)_3]_2S]$ | 45 |
| 3-Butenenitrile $[CH_2 = CHCH_2CN]$ | 45 |
| Adhesive containing a complex organic polysalt as hardener | 2 |

It may be noted that the compounds listed which do not meet the requirements of this invention for active groups do not accelerate the gel of the adhesive.

EXAMPLE 2 (SEE TABLE II)

Adhesive strengths were achieved with the unaccelerated adhesive of Example 1 and a cure cycle of 60 minutes at 350° F. The designated properties were determined by standard ASTM methods, more particularly D1002-64 (tensile shear strength), D903-49 (peel strength), and D1781-60T (climbing drum peel strength),

EXAMPLE 3 (SEE TABLE II AND III)

Results show adhesive strengths achieved when 2.5 percent dimethyldithiocarbamic acid dimethylammonium salt was added to the adhesive of Example 1 and the resulting adhesive was cured for 60 minutes at 300° F. At all testing temperatures, except for the highest (300° F.), the adhesive strengths were only moderately lower than those of Example 2. However, it was found that the adhesive of Example 1 with no accelerator did not cure in 60 minutes at 300° F.

EXAMPLE 4 (SEE TABLE II)

Results show adhesive strengths achieved when the adhesive of Example 3 was cured for 30 minutes at 250° F. Although the adhesive strengths were lower than those obtained in Example 3, they were quite high at all tested temperatures below 300° F.

EXAMPLE 5 (SEE TABLE II)

Results show adhesive strengths achieved when the adhesive of Example 3 was cured for 60 minutes at 225° F. Although the cure temperature was 125° F. lower than that used in Example 2, lap-shear bond strength was adversely affected only at 300° F., the highest test temperature.

EXAMPLE 6 (SEE TABLE II)

Results show adhesive strengths achieved when the adhesive of Example 3 was cured for 90 minutes at 200° F. Excellent lap-shear strength was achieved despite the low temperature, demonstrating the great ability of this compound to catalyze the decomposition of dicy.

EXAMPLE 7 (SEE TABLE II)

Results show adhesive strengths achieved when 2.5 percent tetramethylthiuram disulfide was added to the adhesive of Example 1 and the resulting adhesive was cured at 275° F. for 75 minutes. Despite a 75° F. drop in cure temperature, adhesive strengths were equivalent to those of Example 2, except at 300° F., the highest tested temperature.

EXAMPLE 8 (SEE TABLE)

Results show adhesive strengths achieved with a commercial one-component adhesive utilizing a complex organic polysalt curative when it was cured at 300° F. for 60 minutes.

Table II

|  |  | Example |  |  |  |  |  |  |
|---|---|---|---|---|---|---|---|---|
|  |  | 2 | 3 | 4 | 5 | 6 | 7 | 8 |
| Lap shear at (psi) | −67° F. | 7400 | 6750 | 6050 | 6250 | 5950 | 7100 | 3750 |
|  | 77° F. | 6950 | 6750 | 5150 | 6000 | 5200 | 6600 | 5450 |
|  | 180° F. | 6100 | — | 4600 | 5200 | 4900 | 5900 | — |
|  | 300° F. | 3750 | 600 | 500 | 1400 | 500 | 1000 | 1600 |
| 180-Degree peel at (ppi) | −67° F. | 63 | 63 | 23 | 4 | 5 | 57 | 3 |
|  | 77° F. | 55 | 48 | 36 | 22 | 6 | 47 | 28 |
|  | 300° F. | 30 | 20 | 7 | 10 | 6 | 19 | 28 |
| Climbing-drum peel (ippi) |  | 47 | — | 23 | 4 | 5 | 58 | — |

EXAMPLE 9

The effect of aging specimens bonded with adhesives of Examples 3 8 at 400° F. for 7 days is shown in Table III.

Table III

|  |  | Example 3 | Adhesive of Example 8 (Commercial) |
|---|---|---|---|
| Lap shear at (psi) | −67° F. | 4800 | 500 |
|  | 77° F. | 5450 | 250 |
|  | 300° F. | 700 | 250 |
| 180-Degree peel at (ppi) | −67° F. | 1 | 0 |
|  | 77° F. | 20 | 0 |
|  | 300° F. | 15 | 7 |

It can be seen that the commercial adhesive of Example 8 was much more affected by heat aging that was the adhesive of this invention as in Example 3.

EXAMPLE 10

1.7 percent tetramethylthiruam disulfide was added to the adhesive of Example 1, and the resulting adhesive was cured at 350° F. for 10 minutes. A lap-shear bond strength of 4900 psi was achieved at 80° F.

Mixtures of several of the accelerators may produce improved effects and faster cures and yet lengthen effective shelf life by permitting the use of low concentrations of the more reactive accelerators.

Thus, it may be seen that our invention provides a novel combination of dicyandiamide and accelerator therefor used as a curing agent for epoxy resins. The resulting resin exhibits high adhesive strength, good resistance to heat aging and relatively low cure temperatures and short cure times. Our invention also includes a method of accelerating the cure of epoxy resins using dicyandiamide as a curing agent.

We claim:

1. A composition comprising a 1,2-epoxy ether resin having an epoxy equivalency greater than one, from about one to about twenty percent dicyandiamide, and from about one to about ten percent of an accelerator selected from the group consisting of dimethyl dithiocarbamic acid dimethylammonium salt, bis(dimethylthiocarbamyl) sulfide, tetramethylthiuram disulfide, and tetraethylthiuram disulfide.

2. Composition of claim 1 in which the epoxy resin is a polyglycidyl ether of a polyhydric phenol.

3. Composition of claim 1 in which the epoxy resin is a polyglycidyl ether of bisphenol A having an epoxy equivalent weight of 170 to 1200.

4. A curable composition of matter consisting essentially of
   a. a polyepoxide whose molecule contains on an average more than one 1,2-epoxide groups;
   b. dicyandiamide as curing agent, and
   c. as curing accelerator 0.1 to about 10 percent of a composition of the formula $[[(CH_3)_2NCS]_2S]$.

5. A curable composition of matter consisting essentially of
   a. a polyepoxide whose molecule contains on an average more than one 1,2-epoxide groups;
   b. dicyandiamide as curing agent; and
   c. as curing accelerator 0.1 to about 10 percent of a composition of the formula $[[(CH_3)_2NCS]_2S_2]$.

6. A curable composition of matter consisting essentially of
   a. a polyepoxide whose molecule contains on an average more than one 1,2-epoxide groups;
   b. dicyandiamide as curing agent; and
   c. as curing accelerator 0.1 to about 10 percent of a composition of the formula $$[(CH_3)_2NCSSNH_2(CH_3)_2].$$

7. A method of accelerating the rate of curing of a 1,2-epoxy ether resin having an epoxy equivalency greater than one with dicyandiamide comprising adding to the epoxy resin-dicyandiamide composition from 0.1 to about 10 percent of an accelerator selected from the group consisting of dimethyldithiocarbamic acid dimethylammonium salt, bis(dimethylthiocarbamyl) sulfide, tetramethylthiuram disulfide, and tetraethylthiuram disulfide.

\* \* \* \* \*

UNITED STATES PATENT OFFICE
CERTIFICATE OF CORRECTION

Patent No. 3,903,048            Dated September 2, 1975

Inventor(s) Andrew D. Lombardi, et al

It is certified that error appears in the above-identified patent and that said Letters Patent are hereby corrected as shown below:

Column 3, line 41, after "composition" insert --(containing from about one to about twenty percent dicyandiamide)--.

Column 5, Table II, all entries in last line, "Climbing-drum peel (ippi)", should be moved one column to the right.

Table III, in first heading "Example 3" should read --Adhesive of Example 3--.

*Signed and Sealed this*

*first* Day of *June 1976*

[SEAL]

Attest:

RUTH C. MASON
*Attesting Officer*

C. MARSHALL DANN
*Commissioner of Patents and Trademarks*